United States Patent
Chiueh et al.

(10) Patent No.: US 8,761,136 B2
(45) Date of Patent: Jun. 24, 2014

(54) METHOD FOR ELIMINATING INTERFERENCE IN A RECEIVER, AND ASSOCIATED APPARATUS

(75) Inventors: Tzi-Dar Chiueh, Taipei (TW); Ching-Ting Huang, Taipei County (TW)

(73) Assignees: Mediatek Inc., Science-Based Industrial Park, Hsin-Chu (TW); National Taiwan University, Taipei (TW)

(*) Notice: Subject to any disclaimer, the term of this patent is extended or adjusted under 35 U.S.C. 154(b) by 353 days.

(21) Appl. No.: 12/973,936

(22) Filed: Dec. 21, 2010

(65) Prior Publication Data

US 2012/0155444 A1    Jun. 21, 2012

(51) Int. Cl.
*H04W 84/02* (2009.01)
(52) U.S. Cl.
USPC .......................................................... 370/338
(58) Field of Classification Search
USPC .......... 370/338, 339, 497, 529, 542, 901, 252
See application file for complete search history.

(56) References Cited

U.S. PATENT DOCUMENTS

| 8,289,837 | B2* | 10/2012 | Kim et al. | 370/210 |
|---|---|---|---|---|
| 2004/0101072 | A1* | 5/2004 | Fitton et al. | 375/341 |
| 2006/0215795 | A1 | 9/2006 | Nafie | |
| 2008/0279299 | A1* | 11/2008 | Reuven et al. | 375/267 |
| 2009/0190633 | A1 | 7/2009 | Smith | |
| 2011/0158212 | A1* | 6/2011 | Sakai et al. | 370/338 |

* cited by examiner

*Primary Examiner* — Mark Rinehart
*Assistant Examiner* — Ellen A Kirillova
(74) *Attorney, Agent, or Firm* — Winston Hsu; Scott Margo (57) ABSTRACT

A method for eliminating interference in a receiver (RX) includes: obtaining Bluetooth (BT) information and wireless local area network (Wireless LAN, WLAN) information by performing detection on at least one RX signal, wherein the RX signal is received through an antenna of the RX, and the RX signal includes components of both a BT signal and a WLAN signal that are respectively emitted from at least one transmitter (TX); and performing maximum likelihood (ML) joint detection on frequency representatives of the RX signal according to the BT information and the WLAN information and according to a predetermined library, in order to extract at least one of a reproduced version of the BT signal and a reproduced version of the WLAN signal. An associated apparatus is also provided.

27 Claims, 11 Drawing Sheets

$$\begin{bmatrix} y_0 \\ \vdots \\ y_{95} \\ y_{96} \\ \vdots \\ y_{159} \\ y_{160} \\ \vdots \\ y_{255} \end{bmatrix} = \begin{bmatrix} \times & 0 & \cdots & 0 & 0 & 0 & 0 & 0 & 0 & 0 \\ 0 & \ddots & 0 & 0 & 0 & 0 & 0 & 0 & 0 & 0 \\ \vdots & 0 & \ddots & 0 & 0 & 0 & 0 & 0 & 0 & 0 \\ 0 & 0 & 0 & h_0 & 0 & 0 & 0 & 0 & 0 & 0 \\ 0 & 0 & 0 & 0 & \ddots & 0 & 0 & 0 & 0 & 0 \\ 0 & 0 & 0 & 0 & 0 & h_{63} & 0 & 0 & 0 & 0 \\ 0 & 0 & 0 & 0 & 0 & 0 & \times & 0 & 0 & 0 \\ 0 & 0 & 0 & 0 & 0 & 0 & 0 & \ddots & 0 & 0 \\ 0 & 0 & 0 & 0 & 0 & 0 & 0 & 0 & \ddots & 0 \\ 0 & 0 & 0 & 0 & 0 & 0 & 0 & 0 & 0 & \times \end{bmatrix} \begin{bmatrix} 0 \\ \vdots \\ 0 \\ x_0 \\ \vdots \\ x_{63} \\ 0 \\ \vdots \\ 0 \end{bmatrix} + \begin{bmatrix} b_0 \\ \vdots \\ b_{95} \\ b_{96} \\ \vdots \\ b_{159} \\ b_{160} \\ \vdots \\ b_{255} \end{bmatrix} + \begin{bmatrix} n_0 \\ \vdots \\ n_{95} \\ n_{96} \\ \vdots \\ n_{159} \\ n_{160} \\ \vdots \\ n_{255} \end{bmatrix}$$

Search for $(\hat{x}, \hat{b}) = \arg\min_{x,b} \|y - Hx - b\|^2$

METHOD FOR ELIMINATING INTERFERENCE IN A RECEIVER, AND ASSOCIATED APPARATUS

BACKGROUND

The present invention relates to communication in the industrial, scientific and medical (ISM) frequency bands, and more particularly, to a method for eliminating interference in a receiver, and to an associated apparatus.

The ISM frequency bands were originally reserved internationally for the use of radio frequency (RF) applications for industrial, scientific and medical purposes. Currently, the ISM frequency bands can also be used for license-free wireless communications. Regarding definitions of the ISM frequency bands, please refer to radio regulations of the International Telecommunication Union Radiocommunication Sector (ITU-R) for details.

As those skilled in the art may appreciate, the ISM coexistence problems (i.e. the problems of coexistence interference in the same ISM frequency band) are really a tough issue. More specifically, in a situation where the same frequency band is used by multiple wireless communication devices such as a Bluetooth (BT) device and a wireless local area network (Wireless LAN, WLAN) device complying with IEEE 802.11g specifications, as both the WLAN device and the BT device utilize the 2.4 GHz ISM band, mutual interference typically occurs while the WLAN device and the BT device transmit signals of the same band at the same time. According to the related art, the general solution is to perform collision avoidance with respect to the time domain or the frequency domain, and more particularly, to avoid any simultaneous system operation or to prevent using the same band/sub-band. However, some side effects may occur. For example, the collision avoidance may be involved with scheduling for WLAN packets such as wireless fidelity (Wi-Fi) packets, causing the throughput to be significantly decreased. In another example, the collision avoidance may be involved with adaptive hopping for BT packets, causing the spectral efficiency to be significantly reduced.

As discussed above, the throughput and/or the spectral efficiency are sacrificed for the collision avoidance. Thus, a novel method is required for reducing or eliminating interference without introducing any of the side effects.

SUMMARY

It is therefore an objective of the claimed invention to provide a method for eliminating interference in a receiver, and to provide an associated apparatus, in order to solve the above-mentioned problems.

It is another objective of the claimed invention to provide a method for eliminating interference in a receiver, and to provide an associated apparatus, in order to eliminate interference without need to perform collision avoidance.

An exemplary embodiment of a method for eliminating interference in a receiver (RX) comprises: obtaining Bluetooth (BT) information and wireless local area network (Wireless LAN, WLAN) information by performing detection on at least one RX signal, wherein the RX signal is received through an antenna of the RX, and the RX signal comprises components of both a BT signal and a WLAN signal, which may be respectively emitted from at least one transmitter (TX) (e.g. a single TX such as a BT/WLAN TX, or a plurality of TXs such as a BT TX and a WLAN TX); and performing joint detection (e.g. maximum likelihood (ML) joint detection) on frequency representatives of the RX signal according to the BT information and the WLAN information and according to a predetermined library, in order to extract at least one of a reproduced version of the BT signal and a reproduced version of the WLAN signal.

An exemplary embodiment of an associated apparatus for eliminating interference in an RX comprises at least one detection device and a processing module. The at least one detection device is arranged to obtain BT information and WLAN information by performing detection on at least one RX signal, wherein the RX signal is received through an antenna of the RX, and the RX signal comprises components of both a BT signal and a WLAN signal, which may be respectively emitted from at least one TX (e.g. a single TX such as a BT/WLAN TX, or a plurality of TXs such as a BT TX and a WLAN TX). In addition, the processing module is arranged to perform joint detection (e.g. ML joint detection) on frequency representatives of the RX signal according to the BT information and the WLAN information and according to a predetermined library, in order to extract at least one of a reproduced version of the BT signal and a reproduced version of the WLAN signal.

An exemplary embodiment of a method for eliminating interference in an RX comprises: by performing detection on at least one RX signal, obtaining first information corresponding to a first signal complying with a first communication protocol and second information corresponding to a second signal complying with a second communication protocol that is different from the first communication protocol, wherein the RX signal is received through an antenna of the RX, and the RX signal comprises components of both the first signal and the second signal; and performing joint detection (e.g. ML joint detection) on frequency representatives of the RX signal according to the first information and the second information and according to a predetermined library, in order to extract at least one of a reproduced version of the first signal and a reproduced version of the second signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
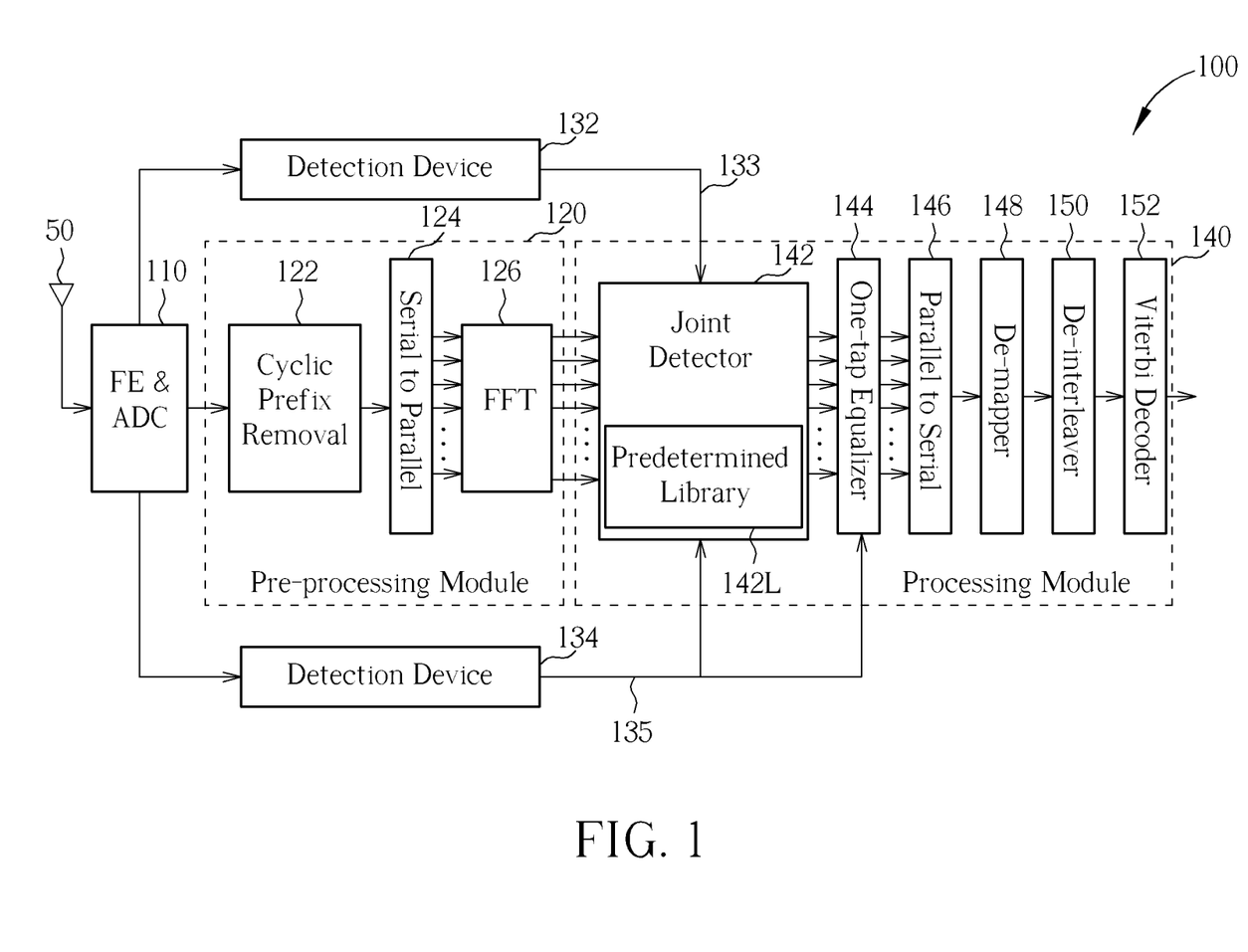
FIG. 1 is a diagram of an apparatus for eliminating interference in a receiver according to a first embodiment of the present invention.

Please refer to FIG. 1, which illustrates a diagram of an apparatus 100 for eliminating interference in a receiver (RX) according to a first embodiment of the present invention. The apparatus 100 comprises a front end (FE) and analog-to-digital converter (ADC) module 110 (labeled "FE & ADC" in FIG. 1), a pre-processing module 120, at least one detection device such as detection devices 132 and 134, and a processing module 140, where the FE and ADC module 110 comprises an FE circuit and an ADC (not shown), the pre-processing module 120 comprises a cyclic prefix removal unit 122 (labeled "Cyclic Prefix Removal" in FIG. 1), a serial to parallel converter 124 (labeled "Serial to Parallel" in FIG. 1), and a Fast Fourier Transform (FFT) unit 126 (labeled "FFT" in FIG. 1), and the processing module 140 comprises a joint detector 142 such as a maximum likelihood (ML) joint detector, a one-tap equalizer 144, a parallel to serial converter 146 (labeled "Parallel to Serial" in FIG. 1), a de-mapper 148, a de-interleaver 150, and a Viterbi decoder 152. For example, the detection device 132 can be a Bluetooth (BT) symbol boundary detection and amplitude/phase estimation unit, and the detection device 134 can be a wireless local area network (Wireless LAN, WLAN) packet detection and channel estimation unit.

In this embodiment, the aforementioned FE circuit and the aforementioned ADC within the FE and ADC module 110 are respectively arranged to perform FE processing and analog-to-digital conversion on at least one RX signal, where the RX signal is received through an antenna 50 of the RX, and the RX signal comprises components of both a first signal complying with a first communication protocol and a second signal complying with a second communication protocol that is different from the first communication protocol. For example, the first signal may be a BT signal complying with Bluetooth specifications, and the second signal may be a WLAN signal complying with IEEE 802.11g specifications, where the BT signal and the WLAN signal may be respectively emitted from at least one transmitter (TX) (e.g. a single TX such as a BT/WLAN TX, or a plurality of TXs such as a BT TX and a WLAN TX). In addition, the pre-processing module 120 is arranged to perform pre-processing. More particularly, the cyclic prefix removal unit 122, the serial to parallel converter 124, and the FFT unit 126 are arranged to perform cyclic prefix removal, serial to parallel conversion, and FFT operations, respectively. However, this should not be a limitation of the present invention; in other words, the pre-processing module 120 may have other configurations.

According to this embodiment, the aforementioned at least one detection device (e.g. the detection devices 132 and 134) is arranged to obtain first information 133 (e.g. BT information 133') and second information 135 (e.g. WLAN information 135') by performing detection such as symbol boundary detection, amplitude/phase estimation, packet detection, and/or channel estimation on the aforementioned at least one RX signal, and more particularly, on samples of the RX signal that are sampled by the ADC mentioned above in this embodiment. In particular, the detection device 132 is arranged to obtain the BT information 133' by performing BT symbol boundary detection on the RX signal and by performing BT amplitude/phase estimation (e.g. BT amplitude and/or phase estimation) on the RX signal, and the detection device 134 is arranged to obtain the WLAN information 135' by performing WLAN packet detection on the RX signal and by performing WLAN channel estimation on the RX signal. Therefore, the detection device 132 can also be referred to as the BT symbol boundary detection and amplitude/phase estimation unit, and the detection device 134 can also be referred to as the WLAN packet detection and channel estimation unit.

In addition, the processing module 140 is arranged to perform joint detection such as ML joint detection on frequency representatives of the RX signal according to the first information 133 and the second information 135 and according to a predetermined library 142L within the joint detector 142, in order to extract at least one of a reproduced version of the first signal and a reproduced version of the second signal (e.g. the reproduced version of the BT signal and/or the reproduced version of the WLAN signal), where the joint detection can be regarded as a detection operation for jointly detecting the first signal and the second signal, such as the BT signal and the WLAN signal, and the frequency representatives of the RX signal can be regarded as the spectrum information of the RX signal. More specifically, the joint detector 142 of this embodiment performs the ML joint detection on the frequency representatives of the RX signal according to the BT information 133' and the WLAN information 135' and according to the predetermined library 142L, and based upon the ML joint detection, the back end of the joint detector 142 within the processing module 140 can extract the aforementioned at least one of the reproduced version of the BT signal and the reproduced version of the WLAN signal. In one embodiment, the processing module 140, and more particularly, the joint detector 142, performs the ML joint detection according to the predetermined library 142L and a WLAN constellation to simultaneously extract the reproduced version of the BT signal and the reproduced version of the WLAN signal. In a situation where the aforementioned back end of the joint detector 142 represents the one-tap equalizer 144, the parallel to serial converter 146, the de-mapper 148, the de-interleaver 150, and the Viterbi decoder 152, the processing module 140 can decode the reproduced version of the WLAN signal. As shown in FIG. 1, the second information 135 such as the WLAN information 135' is further sent to the one-tap equalizer 144. The one-tap equalizer 144 is arranged to perform equalization on the outputs of the joint detector 142 according to the WLAN information 135', and the parallel to serial converter 146, the de-mapper 148, the de-interleaver 150, and the Viterbi decoder 152 are arranged to perform parallel to serial conversion, de-mapping operations, de-interleaving operations, and Viterbi decoding, respectively. As a result, the processing module 140 can generate at least one hard output comprising the decoded WLAN signal. Please note that more operation/calculation units can be implemented within the processing module 140.

In practice, the predetermined library 142L may store spectrum information and/or phase information of a plurality of possible BT symbol combinations of the BT signal. For example, each possible BT symbol combination can be a combination of a predetermined number of BT symbols. In another example, each possible BT symbol combination can be a combination of at least five BT symbols. In addition, the spectrum information of the possible BT symbol combinations that is stored in the predetermined library 142L is adjustable/tunable, and the processing module 140 can retrieve spectrum information of one of the possible BT symbol combinations from the predetermined library and adjust the retrieved spectrum information, in order to generate compensated spectrum information, for use of performing the joint detection. According to some variations of this embodiment, as the predetermined library 142L may store the spectrum information of a plurality of possible data combinations (e.g. constellations) of the WLAN signal, the back end of the joint detector 142 within the processing module 140 can decode the reproduced version of the BT signal according to some detection results of the joint detector 142, where the architecture of the pre-processing module 120 and/or the architecture of the processing module 140 may be altered.

Please note that at least a portion of operations of the apparatus 100, such as those of the joint detector 142, can be implemented by utilizing digital signal processing (DSP) skills. As a result, the apparatus 100 can actively and fundamentally eliminate interference in baseband. In addition, the apparatus 100 of this embodiment comprises at least one portion of the RX. For example, the apparatus 100 may comprise a portion of the RX, such as one or more circuits within the RX. In another example, the apparatus 100 may comprise all of the RX (i.e. the whole RX), and more particularly, the apparatus 100 is the RX. No matter whether at least a portion of operations of the apparatus 100 is implemented by utilizing DSP skills and no matter whether the apparatus 100 comprises a portion or all of the RX, it is achievable that the processing module 140 extracts the aforementioned at least one of the reproduced version of the BT signal and the reproduced version of the WLAN signal without need to perform the collision avoidance mentioned above. Therefore, according to the present invention, the aforementioned ISM coexistence problems can be resolved without introducing any side effect. Please refer to FIG. 2 for further details regarding eliminating interference with the aid of ML joint detection performed by the processing module 140.

Figure 2:
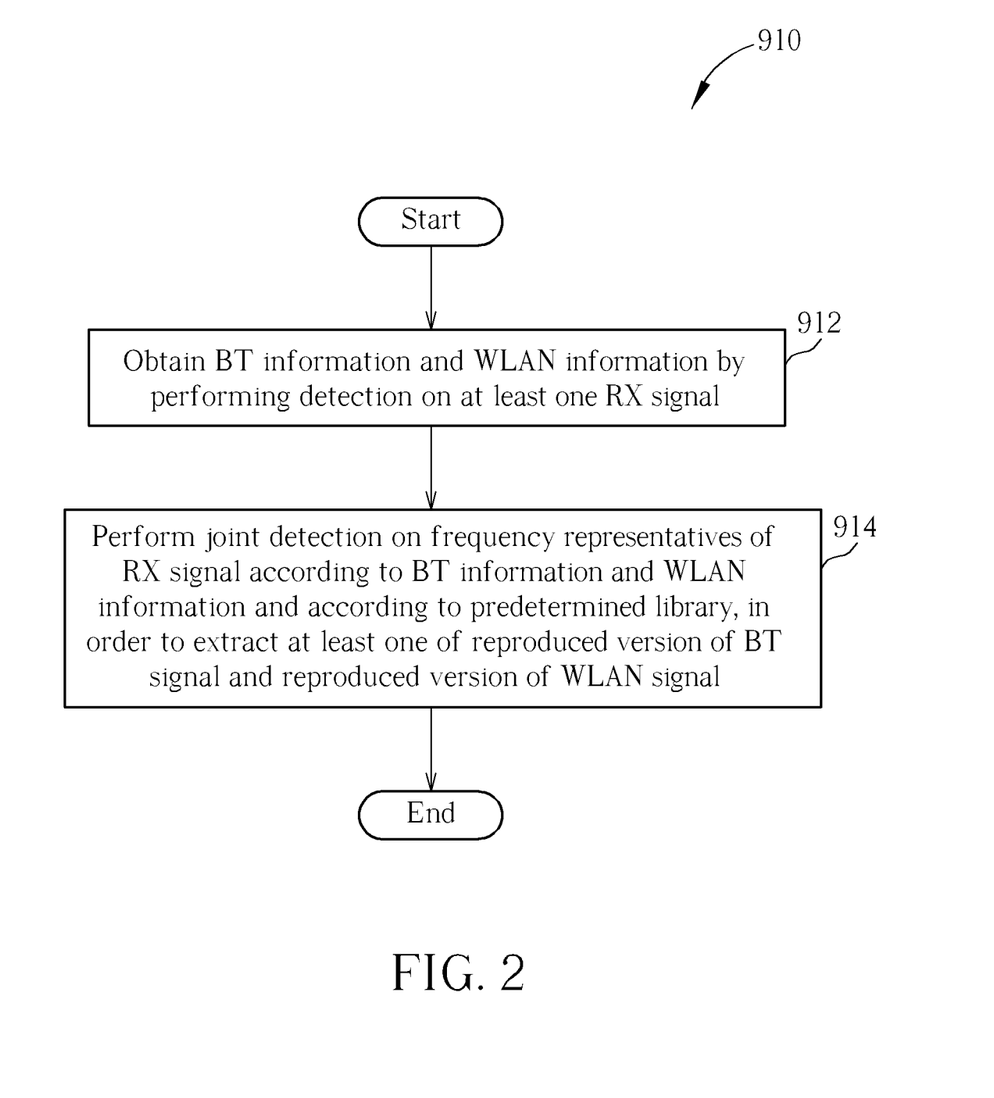
FIG. 2 is a flowchart of a method for eliminating interference in a receiver according to an embodiment of the present invention.

FIG. 2 is a flowchart of a method 910 for eliminating interference in an RX such as that mentioned above according to an embodiment of the present invention. The method 910 can be applied to the apparatus 100 shown in FIG. 1, and more particularly, to the joint detector 142 within the processing module 140. The method 910 is described as follows.

In Step 912, the aforementioned at least one detection device (e.g. the detection devices 132 and 134) obtains the first information 133 (e.g. the BT information 133') and the second information 135 (e.g. WLAN information 135') by performing detection on the aforementioned at least one RX signal, and more particularly, on samples of the RX signal that are sampled by the ADC mentioned above. More particularly, the joint detector 142 can utilize the detection device 132 to obtain the BT information 133' by performing the BT symbol boundary detection and the BT amplitude/phase estimation mentioned above on the RX signal, and can further utilize the detection device 134 to obtain the WLAN information 135' by performing the WLAN packet detection and the WLAN channel estimation mentioned above on the RX signal.

In Step 914, the processing module 140 is arranged to perform joint detection such as the ML joint detection on the frequency representatives of the RX signal according to the first information 133 and the second information 135 and according to the predetermined library 142L, in order to extract at least one of the reproduced version of the first signal and the reproduced version of the second signal (e.g. the reproduced version of the BT signal and/or the reproduced version of the WLAN signal).

Figure 3:
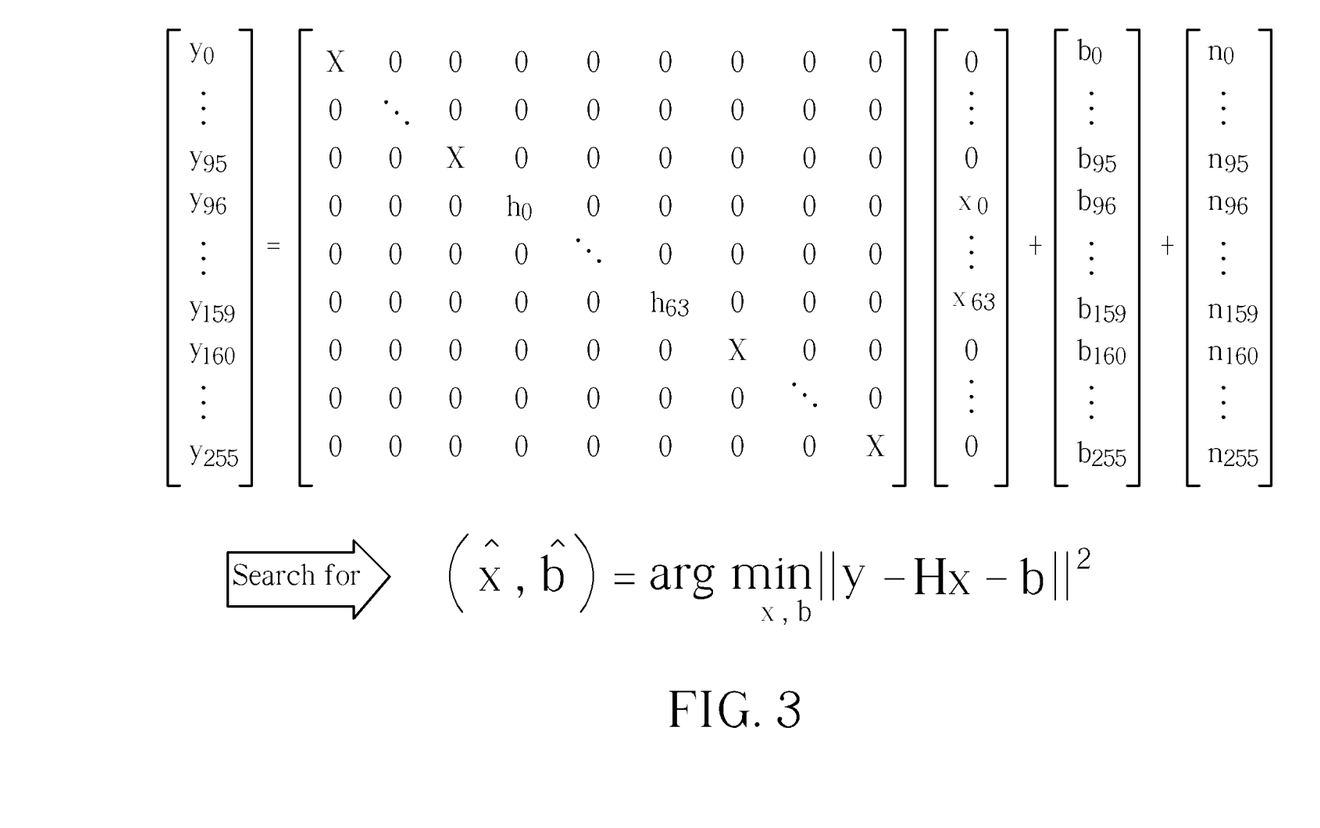
FIG. 3 illustrates an exemplary matrix expression of an equation and a searching operation that are involved with the method shown in FIG. 2 according to an embodiment of the present invention.

According to this embodiment, the processing module 140 can jointly detect the BT signal and the WLAN signal in the frequency domain. The notations y, x, b, and H can be utilized for representing the frequency domain expressions of the RX signal, the WLAN signal, the BT signal, and the WLAN channel response of the WLAN signal, respectively. In addition, the notation n can be utilized for representing the Additive White Gaussian Noise (AWGN), which can be expressed as follows:

$$n \sim N(\mu, \sigma^2)|_{\mu=0};$$

where the function $N(\mu, \sigma^2)$ denotes the normal distribution with the notations $\mu$ and $\sigma$ representing mean and standard deviation, respectively. That is, the AWGN n is distributed normally with mean $\mu$ (which is zero here) and variance $\sigma^2$. The frequency domain expression of the RX signal can be written as follows:

$$y = Hx + b + n;$$

where an exemplary matrix expression of the above equation is illustrated in the upper half of FIG. 3. For example, $y=(y_0, \ldots, y_{95}, y_{96}, \ldots, y_{159}, y_{160}, \ldots, y_{255})$, $x=(0, \ldots, 0, x_0, \ldots, x_{63}, 0, \ldots, 0)$, $b=(b_0, \ldots, b_{95}, b_{96}, \ldots, b_{159}, b_{160}, \ldots, b_{255})$, $n=(n_0, \ldots, n_{95}, n_{96}, \ldots, n_{159}, n_{160}, \ldots, n_{255})$, and the elements of the diagonal of the matrix of H are $\{X, \ldots, X, h_0, \ldots, h_{63}, X, \ldots, X\}$ while the other elements of the matrix of H are all zero, where the notation X means "don't care". In addition, the above equation can be rewritten as follows:

$$y - Hx - b = n.$$

As shown in the lower half of FIG. 3, the processing module 140 performs the ML joint detection by searching for a set of (x, b) corresponding to a minimum value of $\|y-Hx-b\|^2$ according to the BT information 133' and the WLAN information 135' and according to the predetermined library 142L such as a BT library. Typically, the notations x and b of the found set of (x, b) corresponding to the minimum value of $\|y-Hx-b\|^2$ can be written with a hat notation "^" as shown in FIG. 3, respectively.

Regarding implementation of the predetermined library 142L, the predetermined library 142L may include the spectrum information of a plurality of possible BT symbol combinations of the BT signal that are required for performing the ML joint detection, such as the plurality of possible BT symbol combinations mentioned above. Being stored in the predetermined library 142L, the spectrum information of the possible BT symbol combinations can be retrieved when needed, and more particularly, can be utilized for performing the ML joint detection. In order to achieve a better result, each possible BT symbol combination can be a combination of a predetermined number of BT symbols, and the predetermined number can be determined in advance according to some considerations regarding the collision between BT symbols and WLAN packets. For better comprehension, the discussion begins with a simple case with respect to only one WLAN orthogonal frequency division multiplexing (OFDM) symbol of the WLAN signal, such as the WLAN OFDM symbol shown in the lower half of any of FIGS. 4A-4B.

Figure 4A:
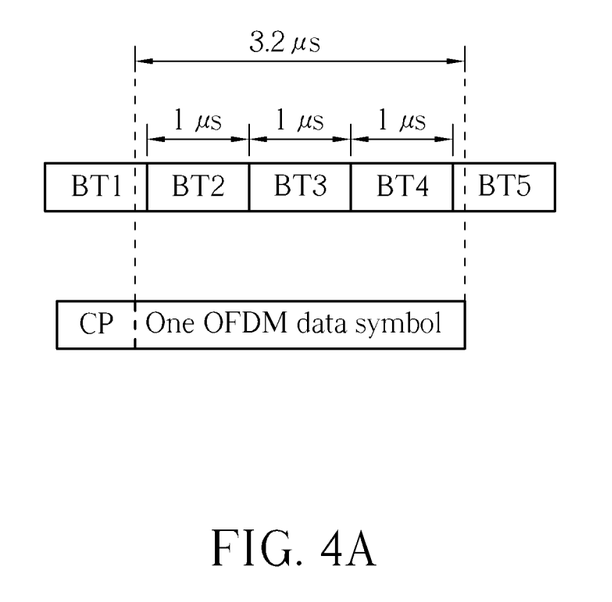
FIGS. 4A-4B respectively illustrate different situations of Bluetooth (BT) symbol collision with respect to at least one wireless local area network (Wireless LAN, WLAN) orthogonal frequency division multiplexing (OFDM) symbol of a WLAN packet according an embodiment of the present invention.
Figure 4B:
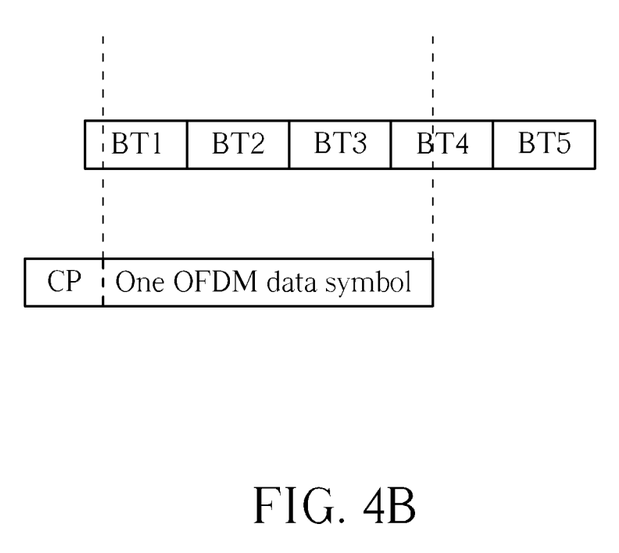

FIGS. 4A-4B respectively illustrate different situations of BT symbol collision with respect to at least one WLAN OFDM symbol of a WLAN packet according an embodiment of the present invention, where the notations BT1, BT2, BT3, BT4, and BT5 represent a plurality of subsequent possible BT symbols in the BT signal. In this embodiment, the WLAN OFDM symbol may comprise a cyclic prefix (CP) and an OFDM data symbol, and a typical length of the OFDM data symbol in the WLAN packet is equal to 3.2 microseconds, while a typical length of one basic rate BT symbol of the BT signal (e.g. any of the BT symbols BT1, BT2, BT3, BT4, and BT5) is equal to 1 microsecond. As the sampling rate of this embodiment is 80 MHz, the resolution is equivalent to 0.0125 microseconds.

Figure 5:
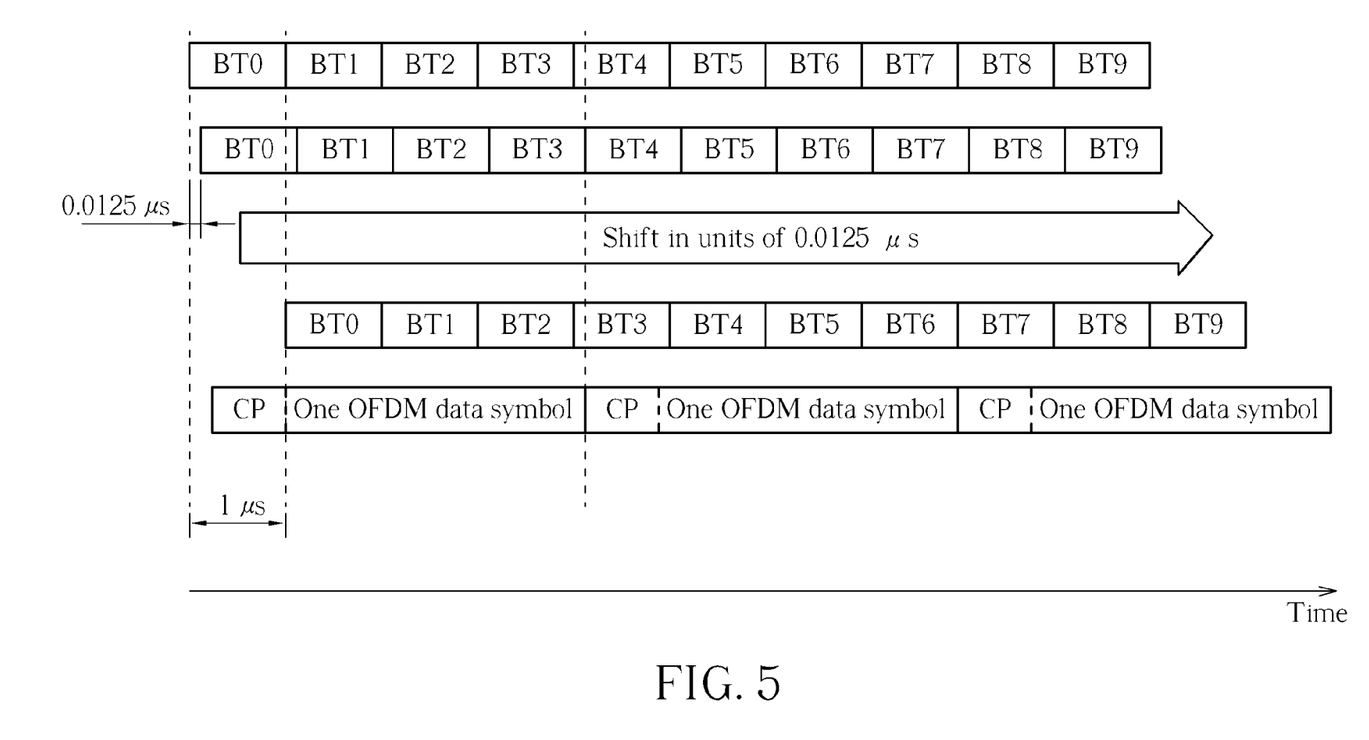
FIG. 5 illustrates different situations of BT symbol collision with respect to WLAN OFDM symbols according an embodiment of the present invention.

According to a variation of this embodiment, such as that shown in FIG. 5, the number of collided WLAN OFDM symbols in a WLAN packet under consideration is greater than one, where the notations BT0, BT1, BT2, BT3, BT4, BT5, BT6, BT7, BT8, and BT9 shown in FIG. 5 represent a plurality of subsequent possible BT symbols in the BT signal. The timing of the first row of BT symbols shown in FIG. 5 may shift in units of 0.0125 microseconds. After 80 times of shifting of the first row of BT symbols, the shifted result thereof is illustrated with the last row of BT symbols, and the relative timing of the shifted result with respect to the original timing of the first row of BT symbols is equal to 1 microsecond. Thus, with regard to the possible timing offsets, the situation corresponding to the last row of BT symbols shown in FIG. 5 repeats the situation corresponding to the first row of BT symbols shown in FIG. 5 since the typical length of one basic rate BT symbol of the BT signal (e.g. any of the BT symbols BT0, BT1, . . . , and BT9) is equal to 1 microsecond.

Figure 6:
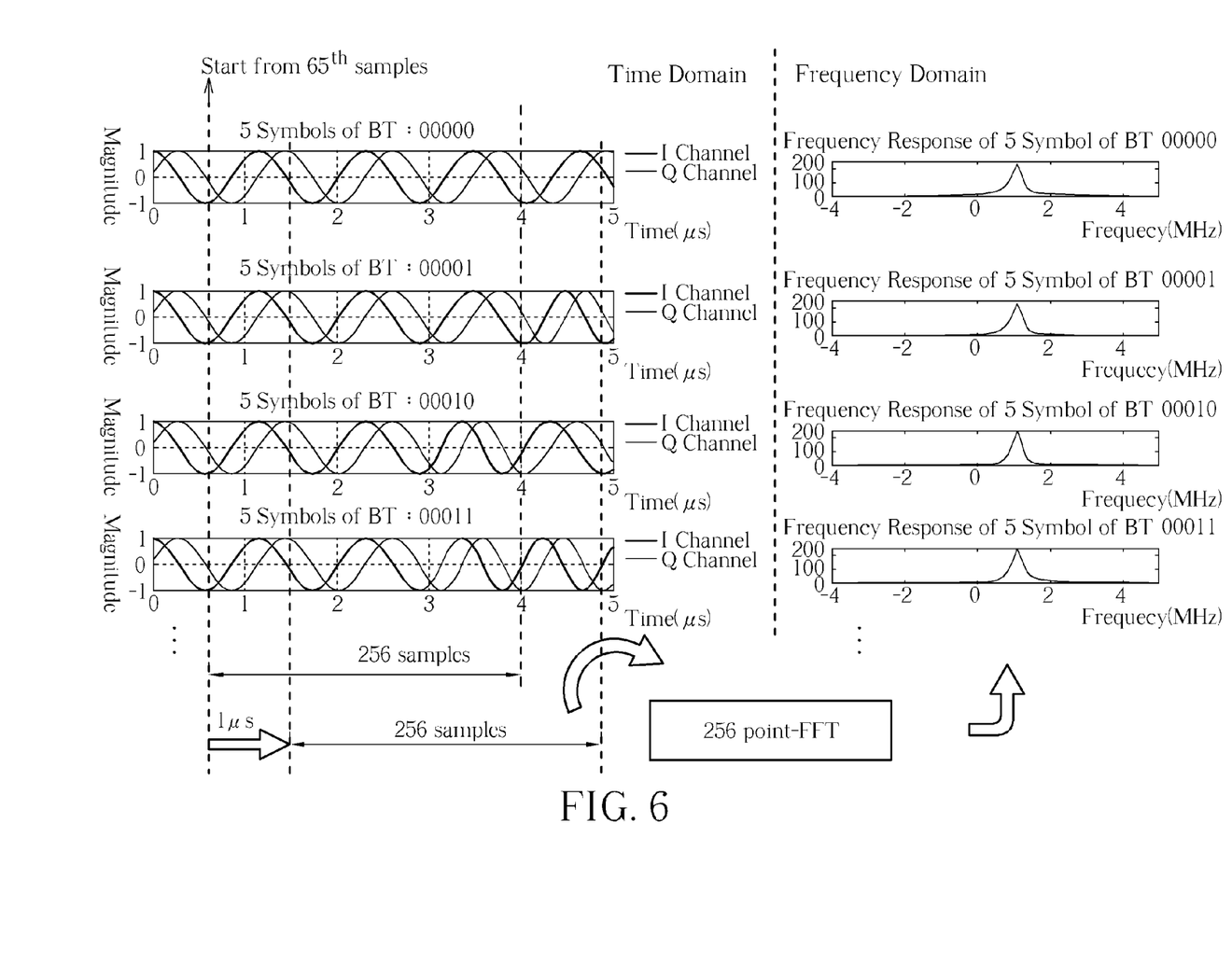
FIG. 6 illustrates some ideal BT signal curves respectively corresponding to different combinations, and further illustrates associated sets of spectrum information for use of performing the ML joint detection involved with the method shown in FIG. 2 according an embodiment of the present invention.

In the embodiment shown in FIGS. 4A-4B, each possible BT symbol combination involved with the predetermined library 142L can be a combination of at least five BT symbols since the OFDM data symbol within the aforementioned WLAN OFDM symbol of the WLAN packet may collide with up to five BT symbols. As each basic rate BT symbol may carry data with a logical value of 0 or a logical value of 1, for each timing offset and for each of 79 possible frequency hopping channels {−39 MHz, −38 MHz, . . . , 39 MHz} of the BT signal (where the 79 possible frequency hopping channels are described with regard to baseband), the combinations of five BT symbols may comprise 32 combinations. In practice, referring to FIG. 6, the predetermined library 142L can be built up in advance by performing FFT operations such as 256-point FFT operations on samples of ideal BT signal curves respectively corresponding to the 32 combinations (e.g. the ideal BT signal curves shown in the left half of FIG. 6). By performing the 256-point FFT operations, associated 32 sets of spectrum information for use of performing the ML joint detection, such as those shown in the right half of FIG. 6, can be obtained, and therefore, can selectively be stored in the predetermined library 142L. For example, for each of the 32 combinations, a 256-point FFT operation can be performed on 256 samples of the ideal BT signal curve corresponding to this combination (and more particularly, on the 256 samples starting from the 65$^{th}$ sample of the ideal BT signal curve under consideration), in order to generate the associated set of spectrum information.

As down converting and the different arrival time of the BT signal with respect to the WLAN signal may cause a phase difference (given that a time shift represented in time domain is equivalent to a phase difference represented in the frequency domain), phase compensation may be required when the processing module 140 performs the ML joint detection according to the predetermined library 142L. More particularly, the phase compensation involved with the ML joint detection may comprise a shifting property compensation operation, where an initial phase compensation operation (the operation for compensating the difference between the real initial phase of modulation and the initial phase defined in the library 142L) may be further required during the ML joint detection performed by the processing module 140. For example, the shifting property compensation operation can be expressed as follows:

$$BT\_LIB'_{SPECTRUM} = BT\_LIB_{SPECTRUM} * e^{j(\omega * k)}.$$

where the notation $BT\_LIB_{SPECTRUM}$ represents the original spectrum information retrieved from the predetermined library 142L, the notation $BT\_LIB'_{SPECTRUM}$ represents the compensated spectrum information obtained from the shifting property compensation operation, and the notation k represents the difference of arrival time. In addition, the initial phase compensation operation can be expressed as follows:

$$BT\_LIB''_{SPECTRUM} = BT\_LIB'_{SPECTRUM} e^{j(\Delta\theta)};$$

where the notation $BT\_LIB''_{SPECTRUM}$ represents the compensated spectrum information obtained from the initial phase compensation operation, and the notation $\Delta\theta$ represents the difference of an initial phase of modulation for the current BT symbol (e.g. the BT symbol under consideration) with respect to the predefined initial phase used by the library 142L.

Figure 7:
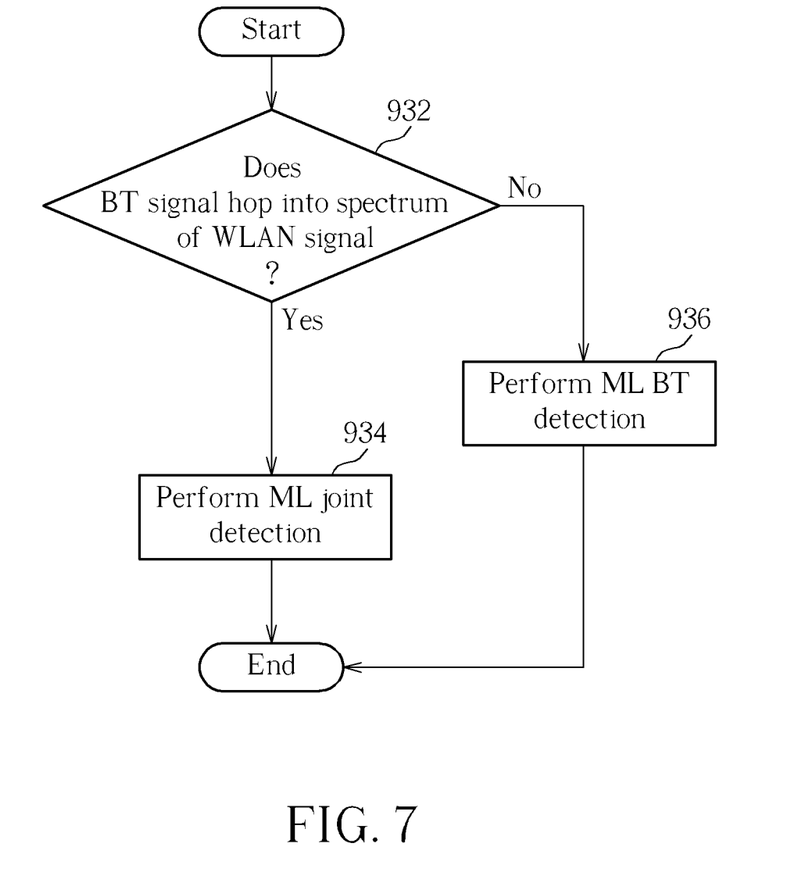
FIG. 7 illustrates a flowchart of ISM-coexistence detection involved with the method shown in FIG. 2 according to an embodiment of the present invention.

FIG. 7 illustrates a flowchart of ISM-coexistence detection involved with the method 910 shown in FIG. 2 according to an embodiment of the present invention. In this embodiment, a simplified version of the joint detector 142 can be utilized as an ML BT detector when the BT signal does not hop into the spectrum of the WLAN signal, where the ML joint detection of the joint detector 142 and the ML BT detection of the ML BT detector can be collectively referred to as the ISM-coexistence detection.

In Step 932, the processing module 140 checks whether the BT signal hops into the spectrum of the WLAN signal according to the BT information 133' and the WLAN information 135' respectively obtained from the detection devices 132 and 134. When it is detected that the BT signal hops into the spectrum of the WLAN signal, Step 934 is entered in order to perform the ML joint detection; otherwise, Step 936 is entered in order to perform the ML BT detection.

In Step 934, the processing module 140 (and more particularly, the joint detector 142 thereof) performs the ML joint detection, which can be referred to as the ML joint BT/WLAN detection in this embodiment.

In Step 936, the processing module 140 (and more particularly, the ML BT detector thereof, such as the simplified version of the joint detector 142) performs the ML BT detection. As the operations of the ML BT detection performed by the ML BT detector are similar to the operations of the ML joint detection performed by the joint detector 142 except that only the BT signal is detected and all of the elements of the matrix of H for the ML BT detector are set as zero, similar descriptions are not repeated in detail for the ML BT detection.

In practice, the joint detector 142 and the ML BT detector can be respective components (or respective operation/calculation units) within the processing module 140, and therefore, both the term HX in $\|y-Hx-b\|^2$ and the matrix multiplication operation of H and X can be omitted in the ML BT detector, where y=b+n, or y−b=n. This is for illustrative purposes only, and is not meant to be a limitation of the present invention. According to some variations of this embodiment, the joint detector 142 and the ML BT detector can be the same component (or the same operation/calculation unit) with an option of setting all of the elements of the matrix of H as zero. According to some variations of this embodiment, the joint detector 142 and the ML BT detector can be the same component (or the same operation/calculation unit) with an option of omitting both the term HX in $\|y-Hx-b\|^2$ and the matrix multiplication operation of H and X.

Figure 8A:
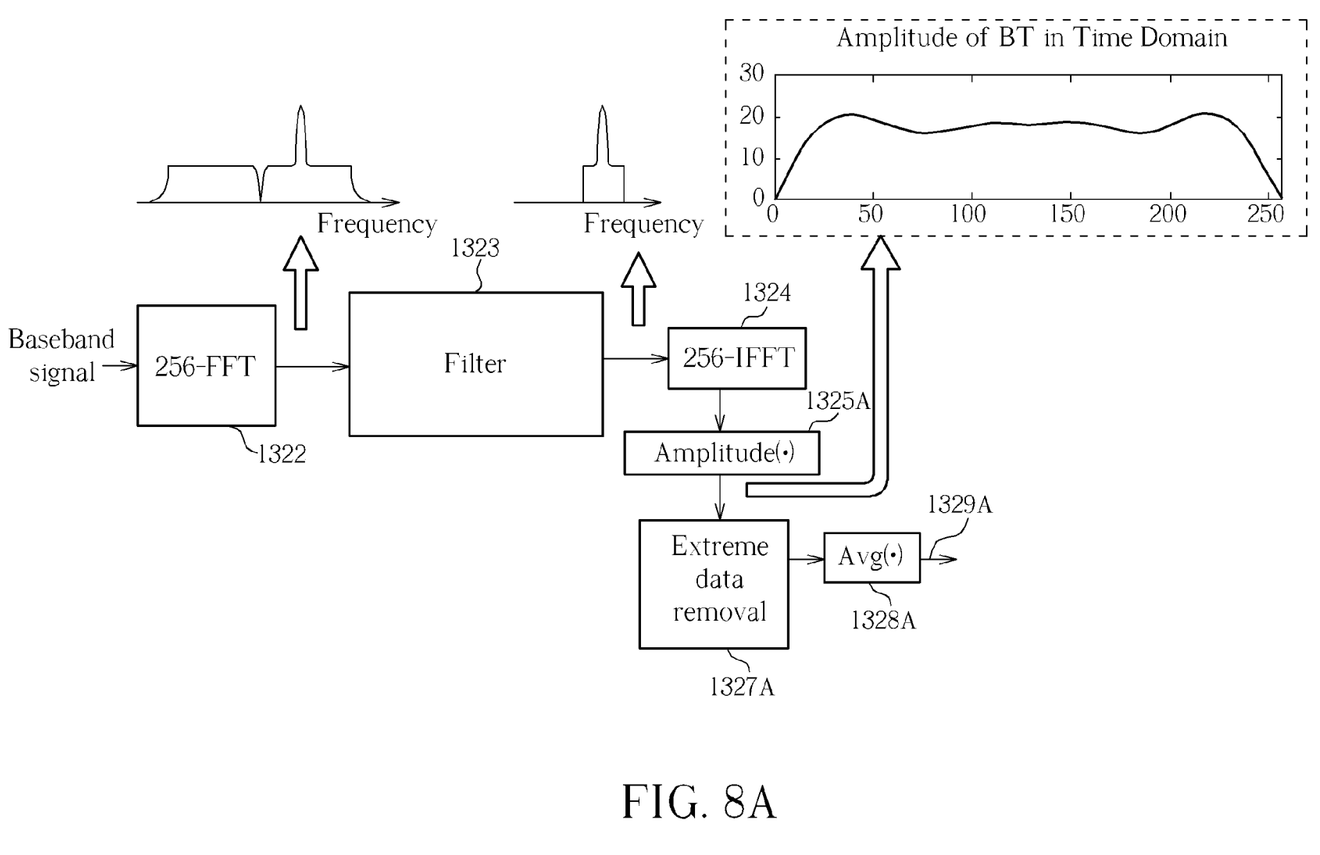
FIG. 8A illustrates BT amplitude estimation involved with the method shown in FIG. 2 according to an embodiment of the present invention.
Figure 8B:
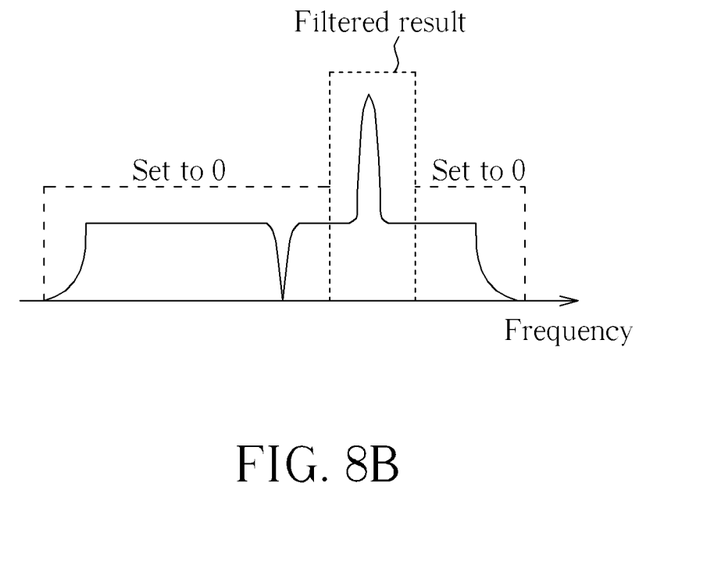
FIG. 8B illustrates a filtering response of a filter involved with the method shown in FIG. 2 according to an embodiment of the present invention.

FIG. 8A illustrates the BT amplitude estimation involved with the method 910 shown in FIG. 2 according to an embodiment of the present invention. By utilizing an FFT unit 1322 (labeled "256-FFT" in FIG. 8A) to perform FFT operations such as the 256-point FFT operation on a baseband signal that is obtained by down-converting the RX signal to baseband, the detection device 132 obtains spectrum information of the RX signal, such as that represented by the curve shown in the upper left of FIG. 8A. Then, the detection device 132 utilizes a filter 1323 (whose filtering characteristics are illustrated in FIG. 8B) to sieve out a portion of spectrum information of the RX signal, and more particularly, the portion corresponding to a current frequency hopping channel of the 79 possible frequency hopping channels {−39 MHz, −38 MHz, . . . , 39 MHz}. By utilizing an Inverse FFT (IFFT) unit 1324 (labeled "256-IFFT" in FIG. 8A) to perform IFFT operations such as 256-point IFFT operations on the filtered spectrum information of the RX signal (i.e. the abovementioned portion of spectrum information of the RX signal), the detection device 132 obtains (or estimates) a plurality of sets of I channel samples and Q channel samples of the BT signal (e.g. the imaginary part and the real part of the BT signal in time domain, respectively). By utilizing an amplitude calculation unit 1325A (labeled "Amplitude(•)" in FIG. 8A) to calculate the amplitude represented by each set of I channel sample and Q channel sample (e.g. the square root of the sum of squares between the I channel sample and the Q channel sample), the detection device 132 can obtain (or estimate) 256 points of BT amplitude information of the received BT signal, such as that represented by the curve shown in the upper right of FIG. 8A. In order to screen out the interference due to the WLAN signal and the filtering operation, the detection device 132 utilizes an extreme data removal unit 1327A (labeled "Extreme data removal" in FIG. 8A) to remove extreme 128 points of BT amplitude information from the estimated 256 points of BT amplitude information, and more particularly, to remove the maximum 64 points of BT amplitude information and the minimum 64 points of BT amplitude information. Thus, the detection device 132 utilizes an average unit 1328A (labeled "Avg(•)" in FIG. 8A) to calculate an average 1329A of the remaining 128 points of the estimated BT amplitude information, and utilizes the average 1329A as the estimated BT amplitude.

According to this embodiment, all of the components shown in FIG. 8A can be implemented within the detection device 132. This is for illustrative purposes only, and is not meant to be a limitation of the present invention. According to some variations of this embodiment, a portion of the components shown in FIG. 8A can be implemented within other portion(s) of the apparatus 100. According to some variations of this embodiment, the detection device 132 can be integrated into the FE and ADC module 110 or the pre-processing module 120.

Figure 9:
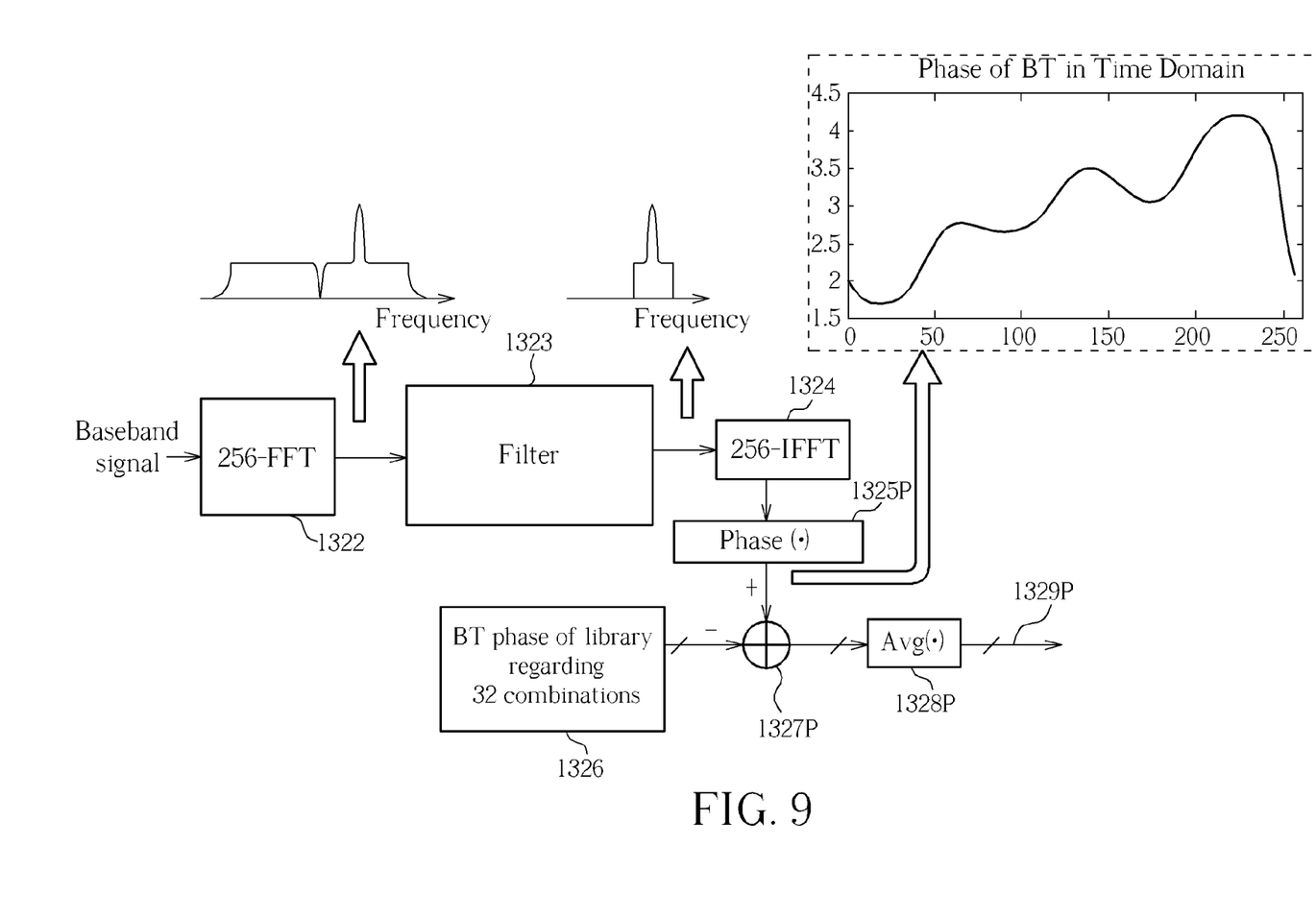
FIG. 9 illustrates BT phase estimation involved with the method shown in FIG. 2 according to an embodiment of the present invention.

FIG. 9 illustrates the BT phase estimation involved with the method 910 shown in FIG. 2 according to an embodiment of the present invention. By utilizing the aforementioned FFT unit 1322 (labeled "256-FFT" in FIG. 9) to perform FFT operations such as the 256-point FFT operation on a baseband signal that is obtained by down-converting the RX signal to baseband (e.g. the baseband signal of the embodiment shown in FIG. 8A), the detection device 132 obtains spectrum information of the RX signal, such as that represented by the curve shown in the upper left of FIG. 9. Then, the detection device 132 utilizes the aforementioned filter 1323 to sieve out a portion of spectrum information of the RX signal, and more particularly, the portion corresponding to the current frequency hopping channel of the 79 possible frequency hopping channels {−39 MHz, −38 MHz, . . . , 39 MHz}. By utilizing the aforementioned IFFT unit 1324 (labeled "256-IFFT" in FIG. 9) to perform IFFT operations such as the 256-point IFFT operation on the filtered spectrum information of the RX signal (i.e. the abovementioned portion of spectrum information of the RX signal), the detection device 132 obtains (or estimates) a plurality of sets of I channel samples and Q channel samples of the BT signal (e.g. the imaginary part and the real part of the BT signal in time domain, respectively). By utilizing a phase calculation unit 1325P (labeled "Phase(•)" in FIG. 9) to calculate the phase represented by each set of I channel sample and Q channel sample, the detection device 132 can obtain (or estimate) 256 points of BT phase information of the BT signal, such as that represented by the curve shown in the upper right of FIG. 9. In addition, the detection device 132 utilizes a known BT phase unit 1326 (labeled "BT phase of library regarding 32 combinations" in FIG. 9) to obtain 32 sets of known BT phase information respectively corresponding to 32 possible BT symbol combinations (which may comprise a portion or all of the plurality of possible BT symbol combinations mentioned above) according to the BT information stored in the predetermined library 142L, where each set of the 32 sets of known BT phase information comprises 256 points of known BT phase information corresponding to one of the 32 possible BT symbol combinations. Afterward, the detection device 132 utilizes at least one arithmetic unit 1327P (e.g. the same arithmetic unit, or 32 arithmetic units) to compare the 256 points of BT phase information of the BT signal with the 256 points of known BT phase information corresponding to each of the 32 possible BT symbol combinations, in order to calculate 32 sets of differences, each set of which comprises 256 differences between the 256 points of the estimated BT phase information of the BT signal and the 256 points of known BT phase information corresponding to one of the 32 possible BT symbol combinations, respectively. Thus, the detection device 132 can utilize at least one average unit 1328P (labeled "Avg(•)" in FIG. 9), such as the same average unit or 32 average units, to calculate 32 averages 1329P of the 32 sets of differences, respectively. More particularly, the detection device 132 can utilize the averages 1329P as the estimated BT phases, from which the joint detector 142 can select the estimated BT phase corresponding to a specific BT symbol combination of the 32 possible BT symbol combinations (e.g. the possible BT symbol combination under consideration) as the aforementioned initial phase difference of modulation (i.e. Δθ).

According to this embodiment, all of the components shown in FIG. 9 can be implemented within the detection device 132. This is for illustrative purposes only, and is not meant to be a limitation of the present invention. According to some variations of this embodiment, a portion of the components shown in FIG. 9 can be implemented within other portion(s) of the apparatus 100. According to some variations of this embodiment, the detection device 132 can be integrated into the FE and ADC module 110 or the pre-processing module 120.

It is an advantage of the present invention that the present invention method and the associated apparatus can eliminate interference without introducing the side effects of the related art. In contrast to the related art, the present invention method and the associated apparatus can eliminate interference without need to perform collision avoidance either in time domain or in frequency domain. As a result, when dealing with the ISM coexistence problems, the present invention method and the associated apparatus can properly extract the signal of interest (e.g. the BT signal and/or the WLAN signal) from the RX signal in a situation where the throughput and the spectral efficiency are not sacrificed.

Those skilled in the art will readily observe that numerous modifications and alterations of the device and method may be made while retaining the teachings of the invention.

What is claimed is:

1. A method for eliminating interference in a receiver (RX), the method comprising:
    obtaining Bluetooth (BT) information and wireless local area network (Wireless LAN, WLAN) information by performing detection using different respective detection techniques on at least one RX signal, wherein the RX signal is received through an antenna of the RX, and the RX signal comprises components of both a BT signal and a WLAN signal; and
    performing joint detection on frequency representatives of the RX signal according to the BT information and the WLAN information and according to a predetermined library by searching for a set of (x, b) corresponding to a minimum cost function f(x,b), wherein x corresponds to the WLAN information and b corresponds to the BT information, in order to extract at least one of a reproduced version of the BT signal and a reproduced version of the WLAN signal.

2. The method of claim 1, wherein the step of obtaining the BT information and the WLAN information by performing the detection on the at least one RX signal further comprises:
    obtaining the BT information by performing BT symbol boundary detection on the RX signal or by performing BT amplitude or phase estimation on the RX signal.

3. The method of claim 1, wherein the step of obtaining the BT information and the WLAN information by performing the detection on the at least one RX signal further comprises:
    obtaining the WLAN information by performing WLAN packet detection on the RX signal or by performing WLAN channel estimation on the RX signal.

4. The method of claim 1, wherein the step of performing the joint detection on the frequency representatives of the RX signal according to the BT information and the WLAN information and according to the predetermined library in order to extract the at least one of the reproduced version of the BT signal and the reproduced version of the WLAN signal further comprises:
    extracting the at least one of the reproduced version of the BT signal and the reproduced version of the WLAN signal without need to perform collision avoidance.

5. The method of claim 1, wherein the predetermined library stores spectrum information or phase information of a plurality of possible BT symbol combinations of the BT signal.

6. The method of claim 5, wherein each possible BT symbol combination is a combination of a predetermined number of BT symbols.

7. The method of claim 5, wherein each possible BT symbol combination is a combination of at least five BT symbols.

8. The method of claim 5, wherein the step of performing the joint detection on the frequency representatives of the RX signal according to the BT information and the WLAN information and according to the predetermined library in order to extract the at least one of the reproduced version of the BT signal and the reproduced version of the WLAN signal further comprises:
    retrieving spectrum information of one of the possible BT symbol combinations from the predetermined library and adjusting the retrieved spectrum information, in order to generate compensated spectrum information, for use of performing the joint detection.

9. The method of claim 5, wherein the set of (x, b) corresponds to a minimum value of $\|y-Hx-b\|^2$ according to the BT information and the WLAN information and according to the predetermined library, wherein notations y and H represent frequency domain expressions of the RX signal and a WLAN channel response of the WLAN signal, respectively.

10. The method of claim 1, wherein the step of performing joint detection on the frequency representatives of the RX signal according to the BT information and the WLAN information and according to the predetermined library in order to extract the at least one of the reproduced version of the BT signal and the reproduced version of the WLAN signal further comprises:
    performing the joint detection according to the predetermined library and a WLAN constellation to simultaneously extract the reproduced version of the BT signal and the reproduced version of the WLAN signal.

11. An apparatus for eliminating interference in a receiver (RX), the apparatus comprising:
    at least one detection device arranged to obtain Bluetooth (BT) information and wireless local area network (Wireless LAN, WLAN) information by performing detection using different respective detection techniques on at least one RX signal, wherein the RX signal is received through an antenna of the RX, and the RX signal comprises components of both a BT signal and a WLAN signal; and
    a processing module arranged to perform joint detection on frequency representatives of the RX signal according to the BT information and the WLAN information and according to a predetermined library by searching for a set of (x, b) corresponding to a minimum cost function f(x,b), wherein x corresponds to the WLAN information and b corresponds to the BT information, in order to extract at least one of a reproduced version of the BT signal and a reproduced version of the WLAN signal.

12. The apparatus of claim 11, wherein the at least one detection device is arranged to obtain the BT information by performing BT symbol boundary detection on the RX signal or by performing BT amplitude or phase estimation on the RX signal.

13. The apparatus of claim 11, wherein the at least one detection device is arranged to obtain the WLAN information by performing WLAN packet detection on the RX signal or by performing WLAN channel estimation on the RX signal.

14. The apparatus of claim 11, wherein the processing module extracts the at least one of the reproduced version of the BT signal and the reproduced version of the WLAN signal without need to perform collision avoidance.

15. The apparatus of claim 11, wherein the predetermined library stores spectrum information or phase information of a plurality of possible BT symbol combinations of the BT signal.

16. The apparatus of claim 15, wherein each possible BT symbol combination is a combination of a predetermined number of BT symbols.

17. The apparatus of claim 15, wherein each possible BT symbol combination is a combination of at least five BT symbols.

18. The apparatus of claim 15, wherein the processing module retrieves spectrum information of one of the possible BT symbol combinations from the predetermined library and adjusts the retrieved spectrum information, in order to generate compensated spectrum information, for use of performing the joint detection.

19. The apparatus of claim 15, wherein the set of (x, b) corresponds to a minimum value of $\|y-Hx-b\|^2$ according to the BT information and the WLAN information and according to the predetermined library, wherein notations y and H represent frequency domain expressions of the RX signal and a WLAN channel response of the WLAN signal, respectively.

20. The apparatus of claim 11, wherein the processing module is arranged to perform the joint detection according to the predetermined library and a WLAN constellation to simultaneously extract the reproduced version of the BT signal and the reproduced version of the WLAN signal.

21. A method for eliminating interference in a receiver (RX), the method comprising:
obtaining Bluetooth (BT) information and wireless local area network (Wireless LAN, WLAN) information by performing detection using different respective detection techniques on at least one RX signal, wherein the RX signal is received through an antenna of the RX, and the RX signal comprises components of both a BT signal and a WLAN signal; and
performing joint detection on frequency representatives of the RX signal according to the BT information and the WLAN information and according to a predetermined library, in order to extract at least one of a reproduced version of the BT signal and a reproduced version of the WLAN signal;
wherein the predetermined library is built up in advance by performing 256-point Fast Fourier Transform operations on a plurality of possible BT symbol combinations corresponding to ideal BT signal curves in order to generate an associated set of spectrum information.

22. The method of claim 21, wherein the step of obtaining the BT information and the WLAN information by performing the detection on the at least one RX signal further comprises:
obtaining the BT information by performing BT symbol boundary detection on the RX signal or by performing BT amplitude or phase estimation on the RX signal.

23. The method of claim 21, wherein the step of obtaining the BT information and the WLAN information by performing the detection on the at least one RX signal further comprises:
obtaining the WLAN information by performing WLAN packet detection on the RX signal or by performing WLAN channel estimation on the RX signal.

24. The method of claim 21, wherein the step of performing the joint detection on the frequency representatives of the RX signal according to the BT information and the WLAN information and according to the predetermined library in order to extract the at least one of the reproduced version of the BT signal and the reproduced version of the WLAN signal further comprises:
extracting the at least one of the reproduced version of the BT signal and the reproduced version of the WLAN signal without need to perform collision avoidance.

25. The method of claim 21, wherein the step of performing the joint detection on the frequency representatives of the RX signal according to the BT information and the WLAN information and according to the predetermined library in order to extract the at least one of the reproduced version of the BT signal and the reproduced version of the WLAN signal further comprises:
retrieving spectrum information of one of the possible BT symbol combinations from the predetermined library and adjusting the retrieved spectrum information, in order to generate compensated spectrum information, for use of performing the joint detection.

26. The method of claim 21, wherein the step of performing the joint detection on the frequency representatives of the RX signal according to the BT information and the WLAN information and according to the predetermined library in order to extract the at least one of the reproduced version of the BT signal and the reproduced version of the WLAN signal further comprises:
performing joint detection by searching for a set of (x, b) corresponding to a minimum value of $\|y-Hx-b\|^2$ according to the BT information and the WLAN information and according to the predetermined library, wherein notations y, x, b, and H represent frequency domain expressions of the RX signal, the WLAN signal, the BT signal, and a WLAN channel response of the WLAN signal, respectively.

27. The method of claim 21, wherein the step of performing joint detection on the frequency representatives of the RX signal according to the BT information and the WLAN information and according to the predetermined library in order to extract the at least one of the reproduced version of the BT signal and the reproduced version of the WLAN signal further comprises:
performing the joint detection according to the predetermined library and a WLAN constellation to simultaneously extract the reproduced version of the BT signal and the reproduced version of the WLAN signal.

* * * * *